United States Patent [19]

Furusawa et al.

[11] Patent Number: 4,782,724
[45] Date of Patent: Nov. 8, 1988

[54] AUTOMATIC TRANSMISSION CONTROL SYSTEM INCORPORATING AN EXHAUST BRAKE

[75] Inventors: Choji Furusawa, Okazaki; Shigeki Goto, Toyota; Isamu Minemoto, Toyota; Satoshi Maruchi, Toyota, all of Japan

[73] Assignees: Aisin Seiki Kabushiki Kaisha; Toyota Jidosha Kabushiki Kaisha, both of Aichi, Japan

[21] Appl. No.: 912,373

[22] Filed: Sep. 29, 1986

[30] Foreign Application Priority Data

Sep. 30, 1985 [JP] Japan ............................ 60-216988

[51] Int. Cl.⁴ .............................................. B60K 41/06
[52] U.S. Cl. ...................... 74/867; 74/752 C; 74/868
[58] Field of Search .............. 74/752 C, 867, 868, 74/869, 732, 731; 192/4 A, 4 B

[56] References Cited

U.S. PATENT DOCUMENTS

| | | | |
|---|---|---|---|
| 3,046,809 | 7/1962 | Snyder | 74/752 C |
| 3,631,950 | 1/1972 | Tanaka | 74/752 C X |
| 3,646,836 | 3/1972 | Kubo et al. | 74/868 X |
| 3,650,160 | 3/1972 | Higuchi et al. | 74/752 C |
| 3,667,323 | 6/1972 | Irie | 74/752 C |
| 4,061,215 | 12/1977 | Ishikawa | 192/4 A |
| 4,291,596 | 9/1981 | Sakakibara | 74/867 |
| 4,365,526 | 12/1982 | Suga et al. | 74/866 |
| 4,438,665 | 3/1984 | Schmidt | 74/752 C X |
| 4,485,695 | 12/1984 | Kawamoto | 74/752 C X |
| 4,534,244 | 8/1985 | Hiramatsu | 74/867 X |
| 4,628,774 | 12/1986 | Iwanaga | 74/867 |

FOREIGN PATENT DOCUMENTS 59-80561 5/1984 Japan .

Primary Examiner—Leslie A. Braun
Assistant Examiner—David Novais
Attorney, Agent, or Firm—Burns, Doane, Swecker & Mathis

[57] ABSTRACT

In an automatic transmission having a torque converter, a planetary gear mechanism receiving an output from the torque converter and including brakes and clutches, and a hydraulic pressure circuit for actuating the brakes and clutches. An arrangement is provided for varying servo hydraulic pressure, which is for achieving low gear, in dependence upon vehicle velocity.

2 Claims, 9 Drawing Sheets

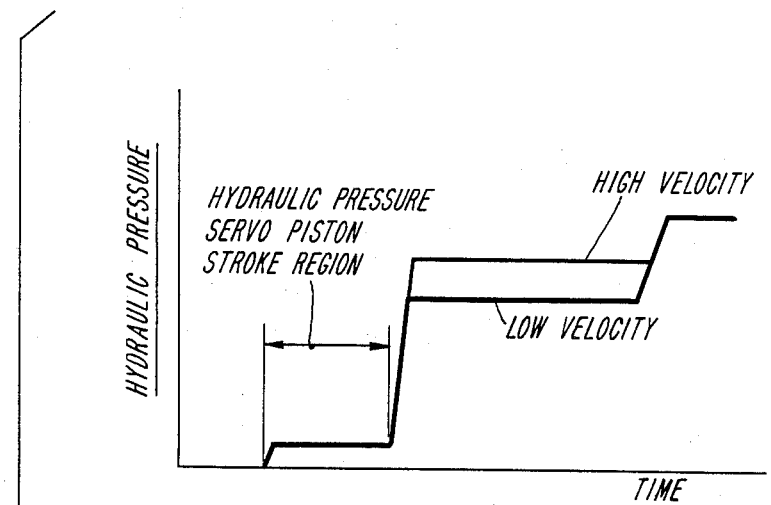
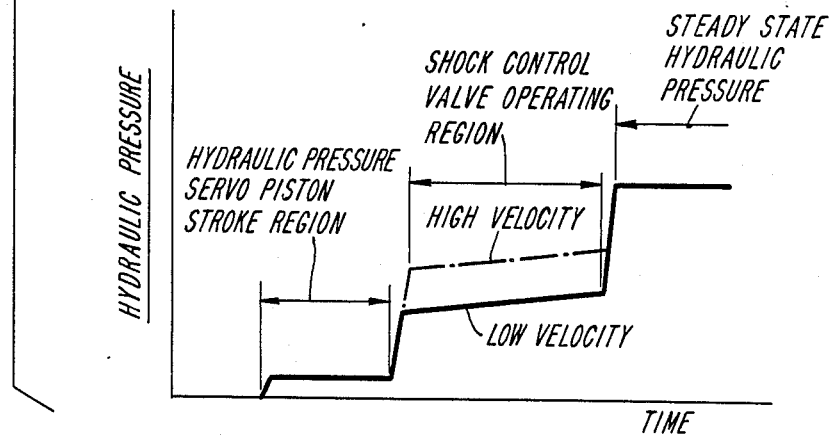
Fig. 6

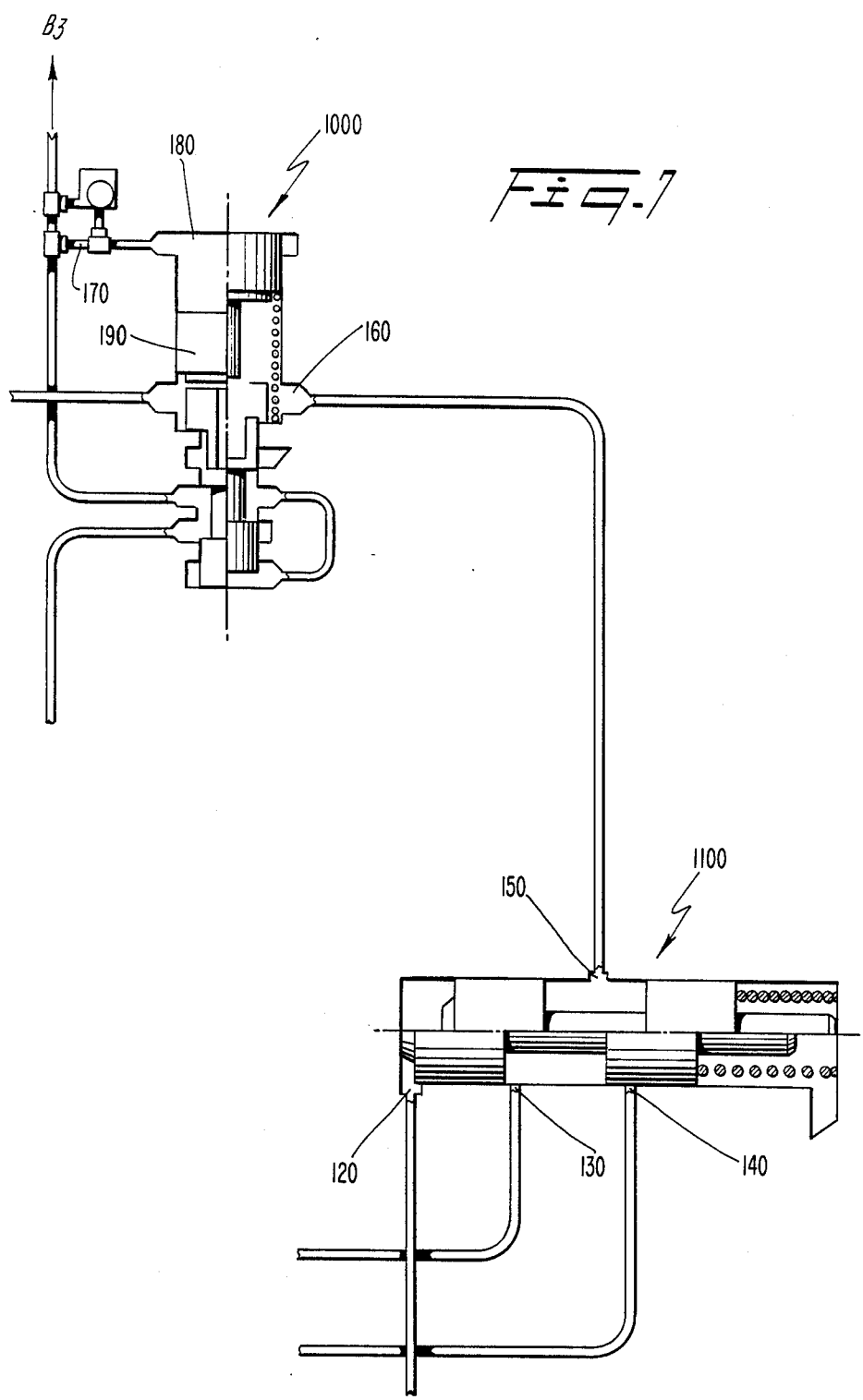

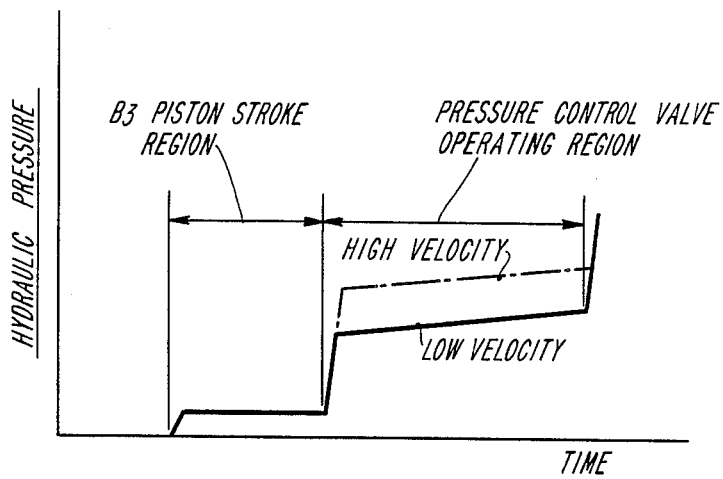
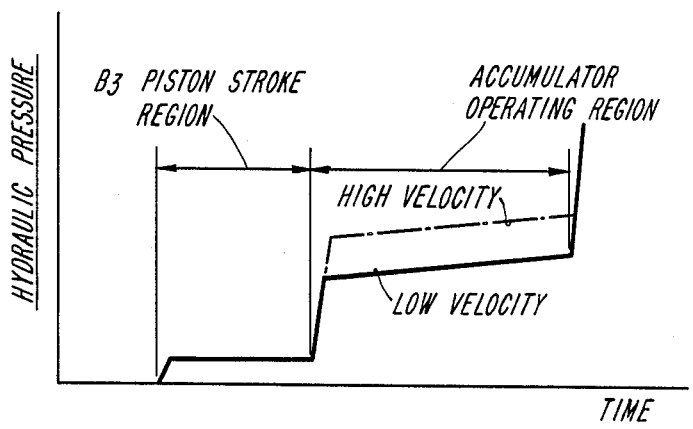

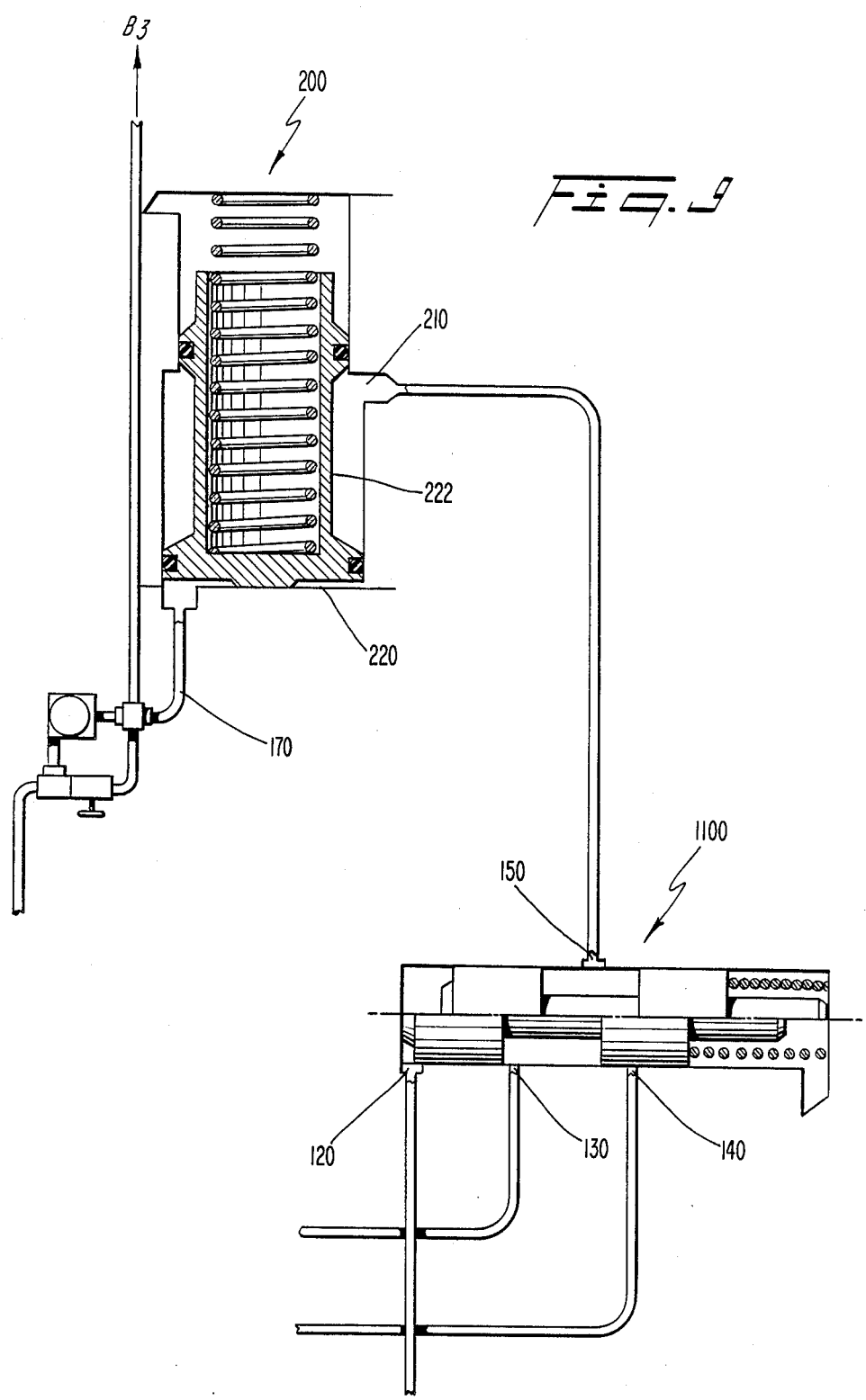

AUTOMATIC TRANSMISSION CONTROL SYSTEM INCORPORATING AN EXHAUST BRAKE

BACKGROUND OF THE INVENTION

1. Field of the Invention:

This invention relates to an automatic transmission equipped with an exhaust brake, in which the actuating pressure of a brake incorporated in a planetary gear mechanism of the automatic transmission is varied in dependence upon vehicle velocity to lighten the load acting upon the brake.

2. Description of the Prior Art:

A vehicle equipped with an exhaust brake apparatus and an automatic transmission is disclosed e.g. in the specification of Japanese Patent Application Laid-Open (Kokai) No. 59-80561.

Automatic transmissions incorporate a planetary gear mechanism, of which various types have been proposed. One such planetary gear mechanism is illustrated in FIG. 1.

With reference to FIG. 1, a torque converter 10 has a well-known structure which includes a pump 12, a turbine 13 and a stator 15. Also included is a high-gear clutch LC. The pump 12 is directly coupled to a crankshaft 17 on the engine side, and the turbine 13 is connected to a turbine shaft 22, which serves as the input shaft. The turbine shaft 22 is directly coupled to a carrier 23 constituting an overdrive mechanism 11. Rotatably supported on the carrier 23 is a planetary pinion 24 that meshes with a sun gear 25 and ring gear 26. A multiple-disc clutch Co and a one-way clutch Fo are arranged in series between the sun gear 25 and carrier 23. A multiple-disc brake Bo is provided between the sun gear 25 and a case 27 for the overdrive mechanism.

The sun gear 26 of the overdrive mechanism 11 is coupled to the input shaft 31 of a planetary gear mechanism 35. A multiple-disc clutch C1 for forward drive is provided between the input shaft 31 and an intermediate shaft 32, and a multiple-disk clutch C2 for reverse drive is arranged between the input shaft 31 and a sun gear shaft 33. Provided between the sun gear shaft 33 and the case 35 of the planetary gear mechanism are multiple-disc brakes B1, B2 and a one-way clutch F1. The sun gear 22 is provided with sun gears 38, 39 that mesh respectively with planetary pinions 36, 19 constituting two single planetary pinions. One of the planetary pinions, namely pinion 19, meshes with a ring gear 43, which is coupled to the intermediate shaft 32. The other planetary pinion, namely pinion 36, meshes with a ring gear 40 coupled to an output shaft 20. The ring gear 40 is coupled to planetary pinion 19 via a carrier 41. A multiple-disc brake B3 and a one-way clutch F2 are arranged in parallel between a carrier 37 of the other planetary pinion 19 and a case 34.

In the gear mechanism so arranged, a variety of transmission ranges can be obtained by engaging and disengaging the various clutches and brakes in dependence upon throttle opening, vehicle velocity and traveling conditions by means of a hydraulic control circuit. Table 1 illustrates the relationship between each range and the engaged/disengaged states of the brake and clutches. In Table 1, O indicates the engaged state and X the disengaged state. Further, ⊙ indicates a freewheeling state during engine braking.

TABLE 1

| Range | Operating Element | | | | | | | One-Way Clutch | |
|---|---|---|---|---|---|---|---|---|---|
| | C0 | C1 | C2 | B0 | B1 | B2 | B3 | F1 | F2 |
| Parking (P) | O | X | X | X | X | X | X | | |
| Reverse (R) | O | X | O | X | X | X | X | | |
| Neutral (N) | O | X | X | X | X | X | O | | |
| D Range | | | | | | | | | |
| 1st | O | O | X | X | X | X | X | | ⊙ |
| 2nd | O | O | X | X | X | O | X | | |
| 3rd | O | O | O | X | X | O | X | | |
| 4th | X | O | O | O | X | O | X | | |
| S Range | | | | | | | | | |
| 1st | O | O | X | X | X | X | X | | ⊙ |
| 2nd | O | O | X | X | O | O | X | | |
| 3rd | O | O | O | X | X | O | X | | |
| L Range | | | | | | | | | |
| 1st | O | O | X | X | X | X | O | | |
| 2nd | O | O | X | X | O | O | X | | |

A hydraulic circuit for actuating these brakes and clutches to obtain the speed ranges shown in Table 1 may be of any well-known construction. Accordingly, a description of the overall hydraulic circuit is deleted except for certain portions thereof discussed below.

Often the exhaust brake apparatus is actuated for a manual downshift from e.g. The S range to first speed in the L range to achieve both exhaust and engine braking for effective braking action. In such case it is necessary to actuate the brake B3. The hydraulic circuit for accomplishing this is shown in FIG. 2.

With reference to FIG. 2, line hydraulic pressure from a regulator valve 1 is admitted into an inlet port 6 of a low-coast valve 5 via an oil line 2, manual valve 3 and oil line 4. Low-coast hydraulic pressure regulated by the low-coast valve 5 enters a 1-2 shift valve 8 via an oil line 7. The valve 8 is shifted to admit the pressure to a chamber for the brake B3.

FIG. 3 shows the relationship between reverse drive torque and engine rotational speed (NE) when the exhaust brake apparatus is turned on and off. The graph clearly shows that reverse drive torque rises with an increase in engine rotational speed. However, as illustrated in FIG. 4, in which output shaft rotational speed (vehicle velocity) is plotted against hydraulic pressure, the hydraulic pressure supplied to the brake B3 is constant with respect to output shaft rotational speed (vehicle velocity) in the prior-art arrangement. The brake B3 is set to a low transfer friction torque volume, which is adapted to a low vehicle velocity (when the exhaust brake is off). In consequence, there is a major deterioration in the durability of the friction members of the brake B3 when engine braking (a downshift from the S range to the L range) is made to take effect at a high vehicle velocity with the exhaust brake on. It is obvious that if a high transfer friction volume is adopted that will accommodate the brake B3 to a high vehicle velocity with the exhaust brake on, the speed-change shock that occurs when a downshift is made will become more pronounced.

SUMMARY OF THE INVENTION

An object of the present invention is to provide an automatic transmission in which speed-change shock at downshifting is reduced and the durability of friction members is improved.

According to the present invention, the foregoing object is attained by providing an automatic transmission for an automotive vehicle having a torque converter, a planetary gear mechanism receiving an output from the torque converter and including a brake actuated by servo hydraulic pressure to achieve low gear, and a hydraulic pressure circuit for supplying the hydraulic pressure that actuates the brake, the automatic transmission comprising: a regulator valve for providing line hydraulic pressure; a manual pump receiving the line hydraulic pressure from the regulator valve; a low-coast valve provided with the line hydraulic pressure by the manual pump for producing regulated low-coast hydraulic pressure; a 1-2 shift valve which receives the hydraulic pressure from the low-coast valve and which is shifted for supplying the hydraulic pressure to a chamber in the brake to actuate the brake; and a governor valve arranged between the regulator valve and the low-coast valve for receiving the line hydraulic pressure from the regulator valve and for supplying a valve chamber of the low-coast valve with governor hydraulic pressure, the hydraulic pressure supplied to the 1-2 shift valve taking on a value regulated by the governor valve, whereby the hydraulic pressure supplied to the chamber of the brake varies depending upon vehicle velocity.

As shown in FIG. 4, the present invention makes it possible to raise the brake servo hydraulic pressure as vehicle velocity increases. As a result, the friction volume of the brake can be selected to have a value conforming to vehicle velocity, thus enabling speed-change shock at downshifting to be reduced while improving the durability of the brake and other friction members.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a graph illustrating a hydraulic pressure rise characteristic in the embodiment of FIG. 5;

FIG. 7 is a view illustrating another embodiment of a hydraulic circuit according to the present invention;

FIG. 8 is a graph illustrating a hydraulic pressure rise characteristic in the embodiment of FIG. 7;

FIG. 9 is a view illustrating still another embodiment of a hydraulic circuit according to the present invention;

FIG. 10 is a graph illustrating a hydraulic pressure rise characteristic is the embodiment of FIG. 9.

DESCRIPTION OF THE PREFERRED EMBODIMENTS

Figure 1:
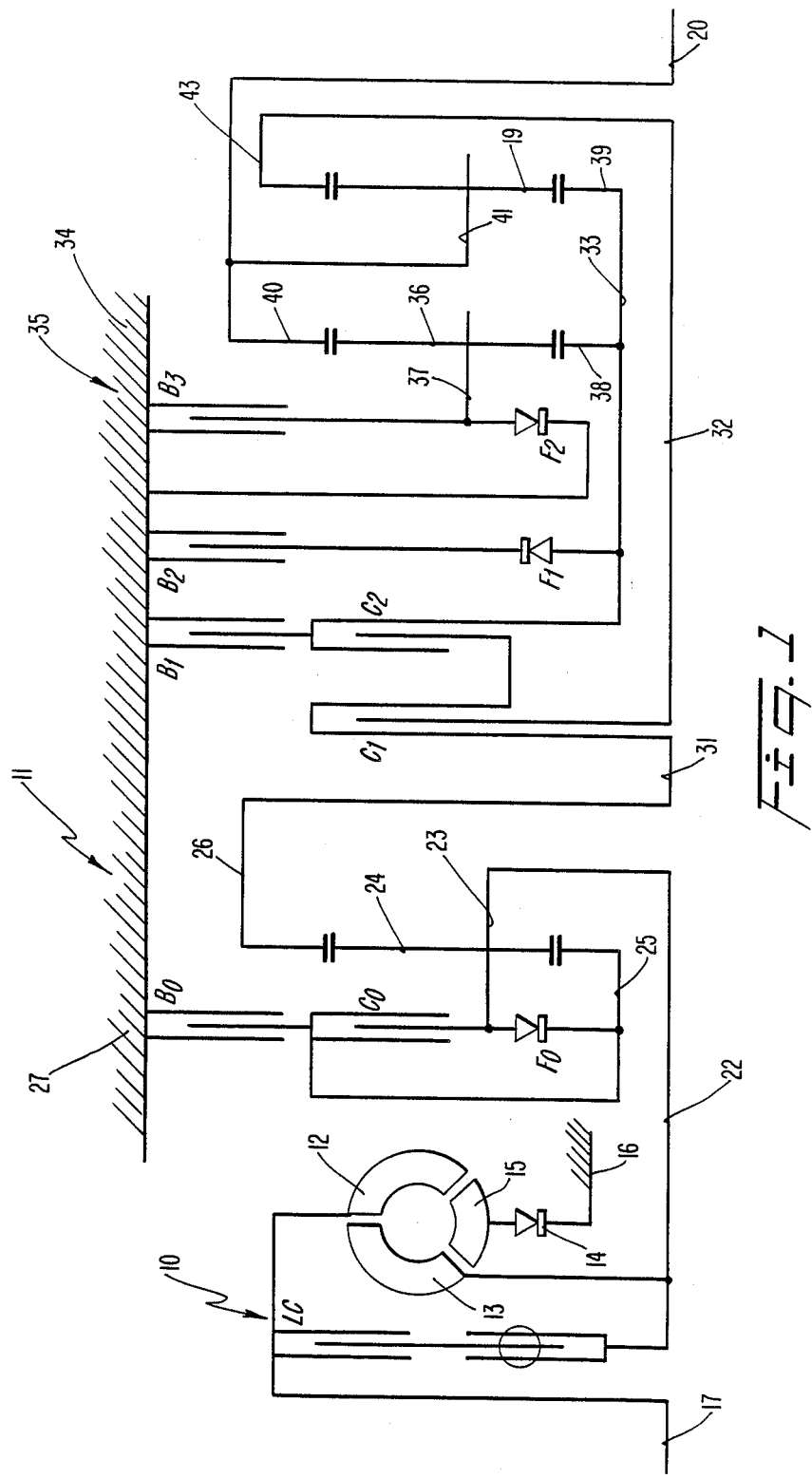
FIG. 1 is a view useful in describing a gear train used in an automatic transmission.
Figure 2:
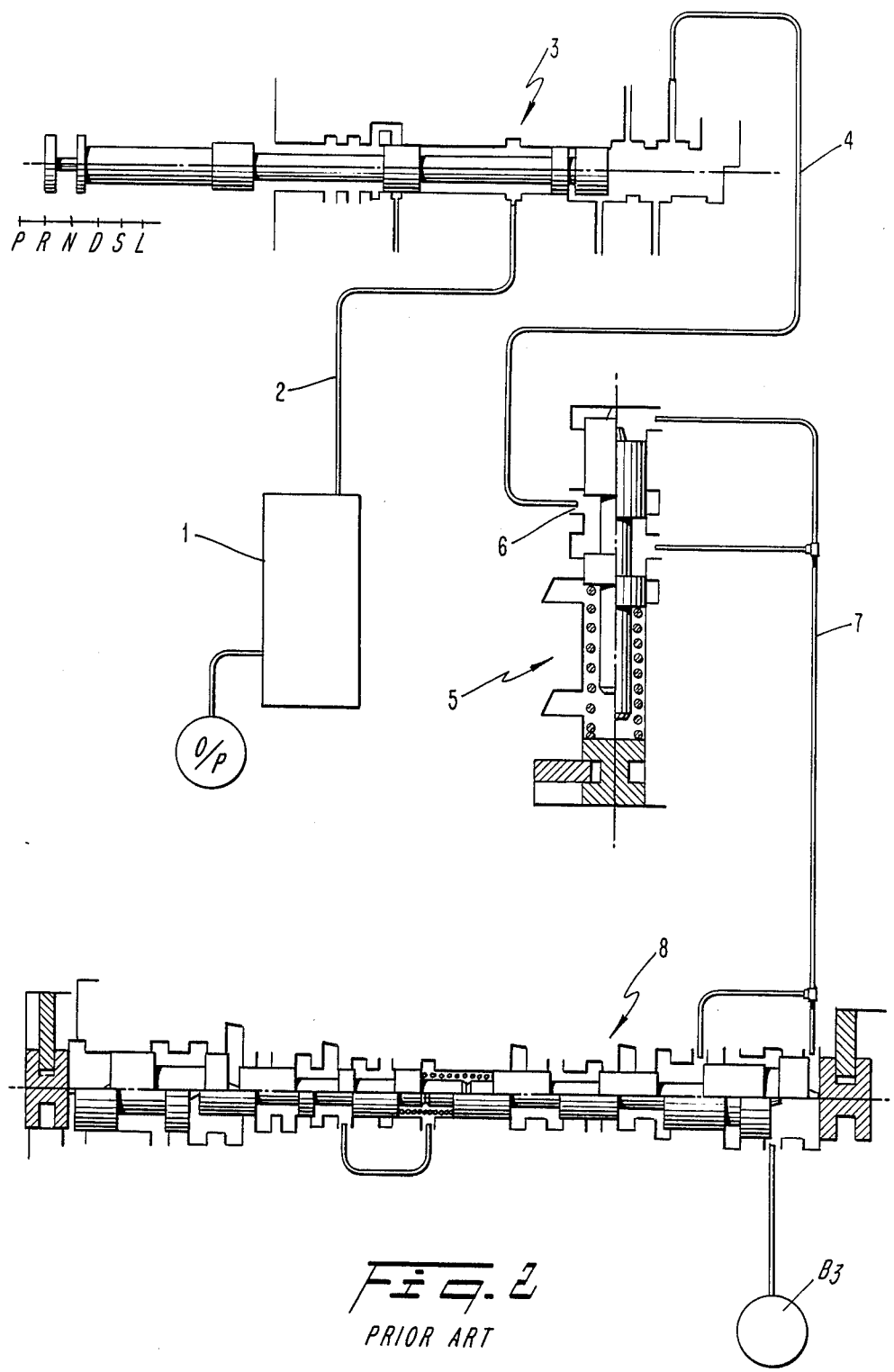
FIG. 2 a view illustrating a prior-art example of a hydraulic pressure circuit for supplying hydraulic pressure to a brake B3.
Figure 3:
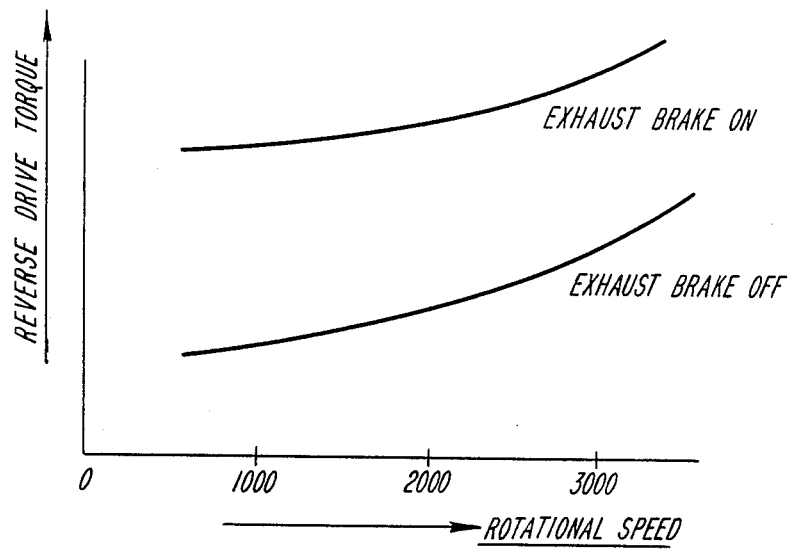
FIG. 3 is a graph illustrating the relationship between engine rotational speed and reverse drive torque.
Figure 4:
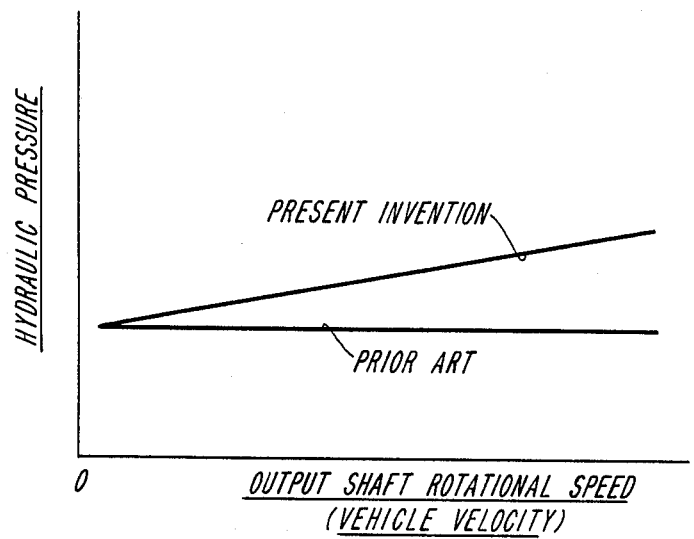
FIG. 4 is a graph illustrating the relationship between vehicle velocity and servo hydraulic pressure (low-coast hydraulic pressure) for the brake B3.
Figure 5:
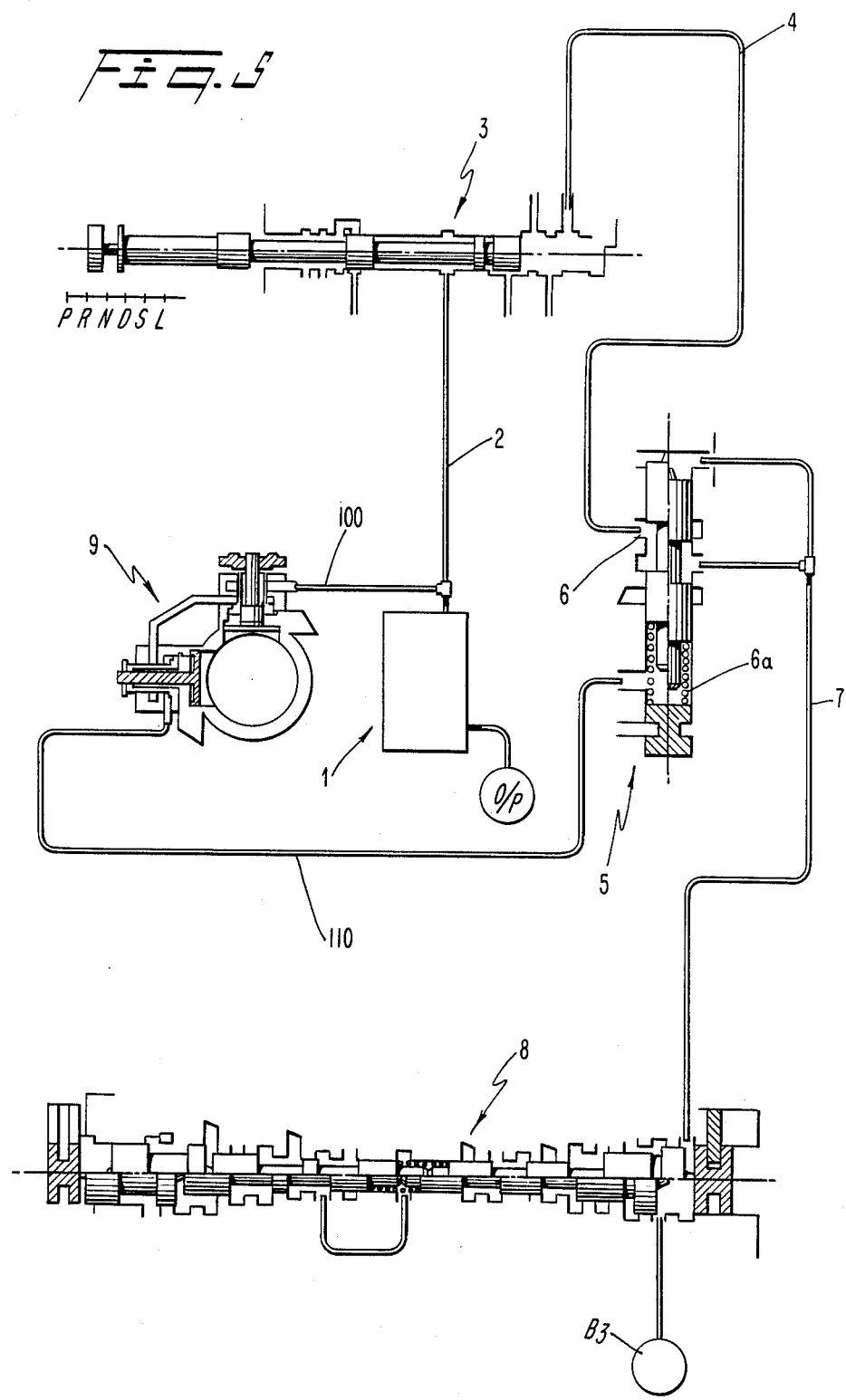
FIG. 5 is a hydraulic circuit diagram according to an embodiment of the present invention.

FIG. 5 illustrates an embodiment of the present invention, which represents certain improvements over the conventional arrangement of FIG. 2. Portions similar to those shown in FIG. 2 are designated by like reference characters and are not described again.

As shown in FIG. 5, line pressure from the oil line 2 is introduced into a valve chamber 6a of the low-coast valve 5 via an oil line 100, a governor valve 9 and an oil line 110. Thus, the hydraulic pressure supplied to the oil line 7 takes on a value regulated by the governor valve 9, namely a value regulated in dependence upon the vehicle velocity. As a result, the pressure supplied to the brake B3 varies depending upon the vehicle velocity. FIG. 6 shows the relationship between time and the hydraulic pressure supplied to the brake B3 in the embodiment of FIG. 5.

FIG. 7 illustrates another embodiment of the present invention having a speed-change pressure control valve 1000 and a governor throttle modulator changeover valve 1100. The valve 1000 has a port 160 for receiving governor hydraulic pressure, a chamber, 180 for receiving hydraulic pressure, and a piston 190. The valve 1100 has a port 120 which receives throttle hydraulic pressure proportional to engine load generated by a throttle valve, a port 130 into which governor hydraulic pressure proportional to vehicle velocity is introduced, a port 140 into which throttle modulator hydraulic pressure (hydraulic pressure proportional to throttle) is introduced, and a port 150 from which governor hydraulic pressure is delivered.

Since the hydraulic pressure produced at the throttle valve is zero at engine braking, a spool in the changeover valve 1100 will occupy the position shown in the lower half of valve 1100 at this time, thus allowing the governor pressure to be delivered from port 150 to the port 160 of control valve 1000. As a result, hydraulic pressure which enters the chamber 180 of control valve 1000 via an orifice 170 overcomes the tension of the valve spring and a lifting force produced by the hydraulic pressure from the port 160, thus causing the piston 190 to occupy the lower position shown in FIG. 7. This enables the hydraulic pressure characteristic of FIG. 8 to be obtained. More specifically, this is a servo hydraulic pressure characteristic for brake B3 that conforms to a change in vehicle velocity, as well as a rise transient characteristic that is optimum with respect to speed-change shock and durability.

FIG. 9 illustrates still another embodiment of the present invention, in which the hydraulic pressure circuit uses an accumulator 200 as a speed-change shock control valve. The accumulator 200 includes a port 210 for receiving governor hydraulic pressure, a chamber 220 for receiving hydraulic pressure from via the orifice 170, and a piston 222. As in the embodiment of FIG. 7, the governor pressure from port 150 of changeover valve 1100 enters the port 210 at engine braking, and the hydraulic pressure admitted into chamber 220 from orifice 170 overcomes the tension of the accumulator spring and the force produced by the hydraulic pressure from port 210, thereby lifting the piston 230. This enables the hydraulic pressure characteristic of FIG. 10 to be obtained. More specifically, this is a servo hydraulic pressure characteristic for brake B3 that conforms to a change in vehicle velocity, as well as a rise transient characteristic that is optimum with respect to speed-change shock and durability.

Figure 11:
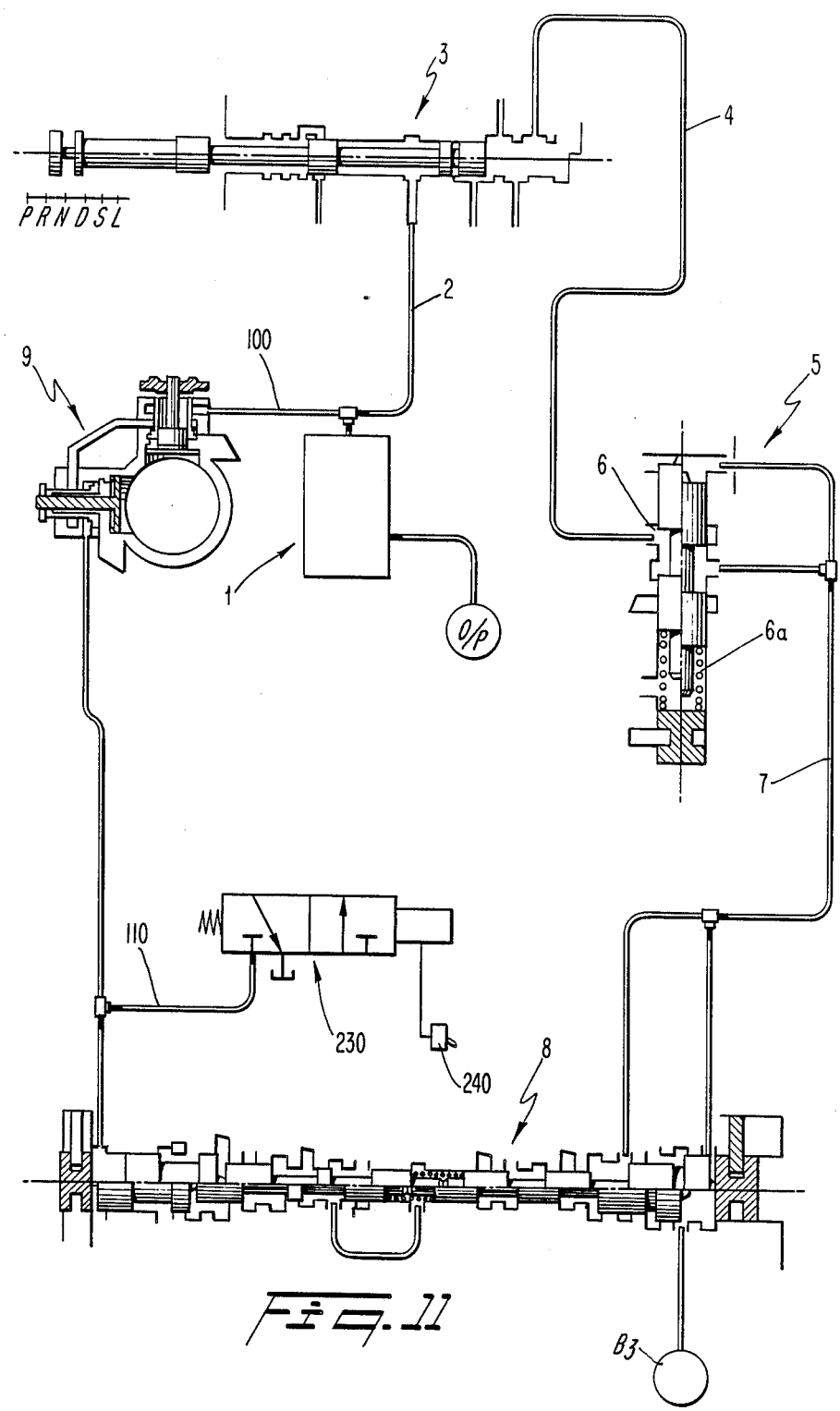
FIG. 11 is a view illustrating a further embodiment of a hydraulic circuit according to the present invention.

FIG. 11 shows a further embodiment representing an improvement over the arrangement of FIG. 5. Here an exhaust brake on/off valve 230 is arranged in the oil line 110, and an exhaust valve manual switch 240 is connected to solenoid constituting the on/off valve 230.

When the manual switch 240 has been turned to the off position (i.e., when exhaust braking is not in effect), the on/off valve 230 does not supply the governor hydraulic pressure to the chamber 6a of low-coast valve 5. Conversely, turning the manual switch 240 on allows the on/off valve 230 to supply the governor pressure to the chamber 6a. The pressure applied to the brake B3 can thus be regulated in dependence upon the on/off state of the exhaust brake. Naturally, this principle can also be applied to a case where servo hydraulic pressure for achieving low gear is rendered constant irrespective of vehicle velocity when the exhaust brake is off.

The present invention makes it possible to set a transfer friction torque volume optimum for the friction members taking into consideration the reverse drive torque at engine braking. The result is improved durability of the friction members. It should also be apparent from the illustrated embodiments that new valves need not be designed, and that only minor improvements need be made in existing circuitry. The advantages of the invention therefore can be obtained in an economical manner.

As many apparently widely different embodiments of the present invention can be made without departing from the spirit and scope thereof, it is to be understood that the invention is not limited to the specific embodiments thereof except as defined in the appended claims.

What we claim is:

1. An automatic transmission for an automotive vehicle having a torque converter, a planetary gear mechanism receiving an output from the torque converter and including a brake actuated by servo hydraulic pressure to achieve low gear, and a hydraulic pressure circuit for supplying the hydraulic pressure that actuates the brake, said automatic transmission comprising:

a regulator valve for providing line hydraulic pressure;

a manual pump receiving the line hydraulic pressure from said regulator valve;

a low-coast valve provided with the line hydraulic pressure by said manual pump for producing regulated low-coast hydraulic pressure;

a 1-2 shift valve which receives the hydraulic pressure from said low-coast valve and which is shifted for supplying the hydraulic pressure to a chamber in the brake to actuate said brake; and a governor valve arranged between said regulator valve and said low-coast valve for receiving the line hydraulic pressure from said regulator valve and for supplying a valve chamber of said low-coast valve with governor hydraulic pressure, the hydraulic pressure supplied to said 1-2 shift valve taking on a value regulated by said governor valve, whereby the hydraulic pressure supplied to the chamber of said brake varies depending upon vehicle velocity.

2. The automatic transmission according to claim 1, further comprising:

an exhaust brake on/off valve arranged between said governor valve and said low-coast valve and having a solenoid by which said exhaust brake on/off valve is actuated, and an exhaust valve manual switch connected to the solenoid, wherein when said manual switch is turned off, said on/off valve does not supply the governor hydraulic pressure to said low-coast valve, and when said manual switch is turned on, said on/off valve supplies the governor pressure to said low-coast valve, whereby the hydraulic pressure supplied to said brake can be regulated in dependence upon the on/off state of an exhaust brake.

* * * * *